3,036,143
BATTERY SEPARATORS

Arthur L. Fisher, Belmont, Roy D. Fountain, Lexington, Richard W. Schweizer, South Duxbury, and John R. Thomas, Belmont, Mass., assignors to W. R. Grace & Co., Cambridge, Mass., a corporation of Connecticut
No Drawing. Filed Jan. 8, 1958, Ser. No. 707,661
8 Claims. (Cl. 136—145)

This invention relates to plate separators for electric storage batteries which are adapted to expand on use thus providing tight packing of the elements within the battery container throughout the life of the battery.

A common cause of battery failure is the effect of the jarring and vibration to which the battery is naturally subjected in the course of its service. Unless the elements within the battery container are very tightly packed, the plate separators are frequently abraded and worn even to the extent of holes being formed in the separators. The paste may be shaken off the plates, and, in extreme cases, the plate frames may be broken.

The problem of ensuring a tight fit of the elements within the battery container is a rather difficult one, however. Battery plates and plate separators may very slightly in thickness within the limits of tolerance accepted by the industry, and, in addition, battery containers do not always have exactly the same interior dimensions. Consequently when the elements are placed in the container, a variable degree of looseness will result. In the past it has been the custom of battery makers to insert thin pieces of wood or other material, known as shims, between the outside plate and the container wall at the time the cell elements are placed in the container in order to fill up the space left in the container and to provide tight packing of the elements. This, however, is a far from satisfactory solution of the problem. The battery maker may not have at his disposal shims of the exact thickness needed to provide satisfactory adjustment. In addition, the judgment of individual workmen will vary as to how tightly the elements should be packed. It is important, therefore, that some means be found to ensure a tight fit of the elements within the battery container without resorting to the use of shims.

We have discovered a method of effecting satisfactory packing within an assembled battery by causing swelling of certain areas of the plate separators in the battery electrolyte. According to our invention, the separators are provided on at least one face thereof with ribs which are adapted to swell on immersion in sulfuric acid, whereby automatic tightening of the element pack is effected after assembly of the battery.

The plate separators may be manufactured from any of the several well-known materials in use at the present time for this purpose. We prefer, however, to use separators which are made of cellulosic material which has been impregnated with phenol formaldehyde resin. The expandable ribs are formed of a plasticized acid-resistant thermoplastic resin composition to which has been added a mineral filler which has the property of expanding substantially in sulfuric acid at the concentration normally existing in electric storage batteries.

We prefer to use as the expanding filler in the separator ribs a naturally occurring calcium silicate known as wollastonite, which exhibits a swelling of 400–500% in sulfuric acid. However, it is well-known that various mineral fillers have the property of absorbing electrolytes from solutions with the result that the fillers are swollen or expanded by the absorbed electrolytes. Any such materials which expand as much as 100% in volume may be used in our improved plate separators provided that, the filler does not react appreciably with sulfuric acid. Portland cement, for example, swells from 400% to 500% in volume in sulfuric acid, but its reaction with the acid is so violent that it is not suitable for use in a separator.

We have found plasticized vinyl chloride resin to be particularly suitable as a material from which the ribs are to be formed. Specifically, we prefer to use a paste grade vinyl chloride resin in the form of a plastisol since this material is easy to handle and to apply to the separator base material. Other acid-resistant thermoplastic resins may be used and may be mixed with an expanding mineral filler and applied as ribs to the separator base material.

The nature of our invention will be more clearly understood by reference to the following examples.

Example I

A plastisol compound was prepared by mixing the following ingredients:

| | Parts |
|---|---|
| Polyvinyl chloride resin-paste grade | 100 |
| Dioctyl phthalate | 85 |
| Clay filler | 20 |
| Anhydrous sodium pyrophosphate | 3 |
| Wollastonite | 90 |

This compound was stirred under vacuum to remove entrapped air and was then transferred to a pumping apparatus such as that described in United States Patent No. 2,651,586 to Cooper et al., the purpose of which is to develop suitable viscosity in plastisol compounds so that the compounds may be applied through a nozzle. When the plastisol material was sufficiently fluid, it was fed through a nozzle or a bank of nozzles which applied plastisol ribs to one face of a web of separator material moving below the nozzles.

The separator material which we prefer to use in connection with our invention is a cellulosic web or paper which has been impregnated with phenol formaldehyde resin and given a partial cure by passing over a heated drum. This type of separator material is well-known and has been described in a number of patents, for example United States Patent No. 2,810,775 to Raphael and Schweizer.

After application of the ribs, the separator material was passed through an oven at 215° C. in order to flux the plastisol and complete the cure of the phenol formaldehyde resin. A time of about 20 seconds was sufficient for the fluxing and cure to be completed.

The ribs so applied to the separator material were found to have a thickness of 1.98 mm. After immersion in sulfuric acid of 1.260 specific gravity for a period of 24 hours at room temperature, the rib thickness had increased to 2.23 mm., an increase of about 12.6%.

Example II

A plastisol composition was made having the following composition:

| | Parts |
|---|---|
| Polyvinyl chloride resin-paste grade | 100 |
| Dioctyl phthalate | 85 |
| Clay filler | 30 |
| Anhydrous sodium pyrophosphate | 3 |
| Wollastonite | 90 |

The compound was mixed and prepared for application and the ribs were applied to the separator material in the manner described in Example I. The increase in thickness of the ribs when soaked in sulfuric acid of 1.260 specific gravity for 24 hours at room temperature was found to be 18.5%.

Example III

The following plastisol composition was made and was applied to separator material as described in Example I:

| | Parts |
|---|---|
| Polyvinyl chloride resin-paste grade | 100 |
| Dioctyl phthalate | 85 |
| Clay filler | 20 |
| Anhydrous sodium pyrophosphate | 3 |
| Wollastonite | 105 |

After the separators so formed were soaked in sulfuric acid of 1.260 specific gravity for 24 hours at room temperature, the ribs were found to have increased in thickness by 22.5%.

*Example IV*

The following plastisol composition was made and ribs formed on separator material as described in Example I:

| | Parts |
|---|---|
| Polyvinyl chloride resin-paste grade | 100 |
| Dioctyl phthalate | 95 |
| Clay filler | 20 |
| Anhydrous sodium pyrophosphate | 3 |
| Wollastonite | 90 |

The increase in thickness of the ribs when soaked in sulfuric acid of 1.260 specific gravity for 24 hours at room temperature was found to be 15.6%.

The amounts of expanding mineral filler may be varied within certain practical limits to give a greater or lesser degree of swelling as desired. We have found, however, that an amount of below 80 parts per 100 parts of resin does not give enough swelling to be of any practical value. More than 130 parts of expanding filler per 100 parts of resin produces a mix which is so thick and hard that it can not be handled easily or applied through nozzles to the web of separator material. For these reasons we prefer to limit the amounts of expanding mineral filler to between 80 and 130 parts per 100 parts of resin.

The amount of clay which is used as a filler in the composition is also important, both because it improves the consistency of the resin composition and, therefore, makes application of the ribs easier, and, because it also slightly increases the swelling properties of the mixture. The amounts of clay which we have found to be most advantageous are from 10 parts to 45 parts of clay per 100 parts of resin.

The amounts of plasticizer in the composition may also be varied. The resin composition must have a certain degree of plasticity in order that it may be applied through nozzles to the separator material, and also so that the cured ribs may be soft enough so that swelling in sulfuric acid may take place. Although we prefer to use about 85 parts of plasticizer per 100 parts of resin, we are able to make expandable ribs with as little as 60 parts of plasticizer per 100 parts of resin. Good results are also obtained with formulations containing as much as 95 parts of plasticizer per 100 parts of resin but above this amount, the composition becomes too thin to handle properly. We have shown the use of dioctyl phthalate as the plasticizer in the composition of the above examples, but we have successfully used a number of other well-known plasticizers for polyvinyl chloride, for example tricresyl phosphate, didecyl phthalate and di-n-octyl decyl phthalate. In addition, we have found that it is possible to replace a part of the primary plasticizer shown in the above examples by as much as 30 parts of a secondary plasticizer such as Mobilsol L, which is the trade name for a petroleum residue product commonly used as a softener for rubber and resins. The following example shows the use of such a secondary plasticizer.

*Example V*

A plastisol composition having the following formulation was prepared and ribs were applied to a web of separator material as directed in Example I:

| | Parts |
|---|---|
| Polyvinyl chloride resin-paste grade | 100 |
| Di-isooctyl phthalate | 57 |
| Petroleum residue softener designated as Mobilsol L | 29.2 |
| Clay filler | 20 |
| Anhydrous sodium pyrophosphate | 3 |
| Wollastonite | 92.5 |

Separators made according to the above example were assembled in storage batteries with the ribs adjacent to the positive plates. The batteries were formed in the usual manner and were subjected to a series of standard battery performance tests. It was found that the ribs of the separators expanded against the positive plates of the battery until a tight fit of the battery elements was obtained. The increase in thickness of the ribs of the separators was measured and was found to be about 15% of the original thickness of the ribs. Standard S.A.E. overcharge and cycling life tests were carried out on batteries which had been insulated with the separators of Example V, as well as with a variety of commercial separators available on the market, and, as a further check, with separators having acid-resistant thermoplastic ribs containing no expandable filler. These tests were modified in such a way as to provide for a period of vibration on an Ordnance Vibration Tester once a week for representative batteries selected from the group. (An Ordnance Vibration Tester is a device for holding a battery firmly and vibrating it at a rate of 2,000 cycles per minute and at an amplitude of 0.05 inch, as specified in United States Military specification MIL B 11188 B, paragraph 4.5.1.1, dated January 17, 1957.) It was found that batteries having separators with expandable ribs performed equally as well in these tests as batteries with any other type of separators. In no case was battery failure attributable to the ribs of the separators.

Another test was conducted in which the element packing was designedly much looser than is normal in battery making practice. A variety of separators was used as in the tests described above. In this test, however, all separators were 0.254 mm. thinner than those which would normally be employed. No shims were added to tighten the element pack. These batteries were formed in the usual manner and were then placed on Ordnance Vibration Testers and were connected to a discharge circuit. A small amount of current was withdrawn from the batteries while they were being subjected to vibration. Vibration was continued in each case until the battery failed. The batteries were then torn down and the different elements were examined.

A striking difference was observed. Batteries containing expandable rib separators were found to be in excellent condition, the elements being tightly and securely packed. These batteries had suffered no ill effects or wear from the continued vibration. On the other hand, batteries which had been assembled with ordinary separators showed severe vibration damage to both separators and plates. A large proportion of the paste had been shaken away from the plates, and the separators showed severe damage due both to abrasion and to contact with the paste from the positive plates. In many cases, the damage to the separators was so extreme that holes had developed in the separator materials.

Our invention includes plate separators with ribs which expand in use regardless of how the ribs are applied to the separator material. For example, instead of using a plastisol composition which is applied to the separator by means of nozzles, we may use a harder resin composition containing an expandable filler, in which case ribs may be preformed by cutting and the ribs may be cemented to the separator material. While we have described a separator having expanding ribs applied to only one side of flat separator material, it is within the scope of our invention to apply the ribs to both sides of the separator material if extra strength or extra spacing between the plates is desired. Alternatively, we may employ a separator material which has been ribbed by processes well-known in the art, and may apply the expanding rib material to the tops of the already existing ribs.

We claim:

1. A plate separator for use in electric storage batteries having attached to at least one face thereof solid ribs formed of an expandable acid-resistant resin composition containing a dry particulate, unswollen mineral filler embedded therein such that substantially the entire surface area of each particle of the filler which is not at the outer surface of a rib is in physical contact with the resin, said mineral filler being characterized by its ability to swell upon contact with battery acid solution whereby immersion of the separator in such solution will result in substantial physical expansion of the ribs.

2. A plate separator as in claim 1 in which the body of the separator to which the ribs are attached is a sheet of a resin-impregnated cellulosic material.

3. A separator according to claim 1 in which the ribs are formed of plasticized polyvinyl chloride composition containing wollastonite as a filler.

4. A separator according to claim 3 in which the ribs are formed of a resin composition containing from 80 to 130 parts of wollastonite per 100 parts of polyvinyl chloride resin.

5. A separator according to claim 3 in which the ribs are formed of a resin composition containing from 80 to 130 parts of wollastonite and from 60 to 95 parts of plasticizer per 100 parts of polyvinyl chloride resin.

6. A separator according to claim 2 in which the ribs are formed of a plasticized polyvinyl chloride composition containing wollastonite as a filler.

7. The method of making a battery separator which includes the steps of mixing with a plasticized resin a dry, unswollen filler which is capable of expanding on contact with sulfuric acid, forming the resin-filler mixture into a plurality of ribs, and attaching the said ribs to a web of resin-impregnated cellulosic separator material.

8. The method of claim 7 in which the plasticized resin is a polyvinyl chloride plastisol and in which the separator material is heated after application of the ribs in order to solidify the polyvinyl chloride composition of the ribs.

References Cited in the file of this patent

UNITED STATES PATENTS

| 1,495,568 | Benner | May 27, 1924 |
| 1,786,328 | Benner et al. | Dec. 30, 1930 |
| 2,526,591 | Szper | Oct. 17, 1950 |
| 2,681,377 | Smithers | June 15, 1954 |
| 2,772,322 | Witt et al. | Nov. 27, 1956 |
| 2,936,328 | Sillcox et al. | May 10, 1960 |

(Continuation-in-part of application Ser. No. 433,208 filed May 28, 1954)

FOREIGN PATENTS

| 834,629 | France | Nov. 25, 1938 |
| 30,602/1909 | Great Britain | Mar. 31, 1911 |
| 12,478/1899 | Great Britain (II) | Apr. 7, 1900 |